United States Patent
Chamberlain et al.

(10) Patent No.: US 9,981,880 B2
(45) Date of Patent: May 29, 2018

(54) COATING FIBERS USING DIRECTED VAPOR DEPOSITION

(71) Applicant: Rolls-Royce Corporation, Indianapolis, IN (US)

(72) Inventors: Adam L. Chamberlain, Mooresville, IN (US); Andrew J. Lazur, Huntington Beach, CA (US); Kang N. Lee, Zionsville, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 294 days.

(21) Appl. No.: 14/876,270

(22) Filed: Oct. 6, 2015

(65) Prior Publication Data
US 2016/0096778 A1 Apr. 7, 2016

Related U.S. Application Data

(60) Provisional application No. 62/060,662, filed on Oct. 7, 2014.

(51) Int. Cl.
*C23C 16/30* (2006.01)
*C04B 35/628* (2006.01)

(52) U.S. Cl.
CPC .. *C04B 35/62847* (2013.01); *C04B 35/62849* (2013.01); *C04B 35/62852* (2013.01); *C04B 35/62863* (2013.01); *C04B 35/62868* (2013.01); *C04B 35/62871* (2013.01); *C04B 35/62873* (2013.01); *C04B 35/62884* (2013.01); *C04B 35/62894* (2013.01); *C04B 2235/522* (2013.01); *C04B 2235/524* (2013.01); *C04B 2235/5244* (2013.01); *C04B 2235/5248* (2013.01)

(58) Field of Classification Search
CPC ......... C23C 16/40; C23C 16/30; C23C 16/32; C23C 16/325; C23C 16/34; B05D 7/00
See application file for complete search history.

(56) References Cited

U.S. PATENT DOCUMENTS

| | | | |
|---|---|---|---|
| 4,746,480 A | 5/1988 | Clark | |
| 5,110,771 A | 5/1992 | Carpenter et al. | |
| 5,190,820 A | 3/1993 | Millard et al. | |
| 5,422,319 A * | 6/1995 | Stempin | C03C 8/02 428/367 |
| 5,552,352 A | 9/1996 | Brun et al. | |
| 5,736,073 A | 4/1998 | Wadley et al. | |
| 6,322,889 B1 | 11/2001 | Lara Curzio et al. | |
| 6,863,868 B1 * | 3/2005 | Alvin | B01D 39/2027 422/168 |
| 9,708,226 B2 * | 7/2017 | Lazur | C04B 41/87 |

(Continued)

OTHER PUBLICATIONS

Edie, D. D., et al., "Thermoplastic Coating of Carbon Fibers". Advances in Thermoplastic Matrix Composite Materials, ASTM STP 1044, G.M. Newaz, Ed., American Society for Testing and Materials, Philadelphia, 1989, pp. 50-61.*

(Continued)

*Primary Examiner* — Bret P Chen
(74) *Attorney, Agent, or Firm* — Brinks Gilson & Lione

(57) ABSTRACT

A method of making a fiber tow coating is provided. The method includes providing a fiber tow selected from the group consisting of carbon and silicon; and applying an oxide-based fiber interface coating onto the fiber tow using directed vapor deposition or other like deposition method.

18 Claims, 2 Drawing Sheets

(56) References Cited

U.S. PATENT DOCUMENTS

| | | | | |
|---|---|---|---|---|
| 2008/0020193 | A1* | 1/2008 | Jang | B29C 70/025 |
| | | | | 428/292.1 |
| 2010/0080984 | A1 | 4/2010 | Lee | |
| 2010/0242265 | A1* | 9/2010 | Wadley | H01M 6/40 |
| | | | | 29/623.5 |
| 2015/0274979 | A1* | 10/2015 | Lazur | C04B 35/565 |
| | | | | 428/216 |

OTHER PUBLICATIONS

Ge brochure, "In-line Fiber Tow Coating for Ceramic Matrix Composites". DoD Office of Security Review, 11-S-0091, Jan. 2011, pp. 1-2.*

Groves, J.F., et al., "Directed Vapor Deposition: Low Vacuum Materials Processing Technology". University of Virginia, Materials Science and Engineering, Report Documentation, 2000, pp. 1-14.*

Hass, D.D., et al., "Electron beam directed vapor deposition of thermal barrier coatings". J. Vac. Sci. Technol. A 16(6), Nov./Dec. 1998, pp. 3396-3401.*

* cited by examiner

COATING FIBERS USING DIRECTED VAPOR DEPOSITION

CROSS REFERENCE TO RELATED APPLICATIONS

This application claims priority to and the benefit of U.S. Provisional Patent Application No. 62/060,662, filed 7 Oct. 2014, the disclosure of which is now expressly incorporated herein by reference.

TECHNICAL FIELD AND SUMMARY

The present disclosure relates to fiber coatings and, in particular, to depositing a coating or coatings on a multi-filament fiber tow material using directed vapor deposition, chemical vapor infiltration, or similar processes.

Economic and environmental concerns, i.e. improving efficiency and reducing emissions, are driving forces behind the ever increasing demand for higher gas turbine inlet temperatures. Designers of gas turbine engines recognize that a limitation to the efficiency and emissions of many gas turbine engines is the temperature capability of hot section components (examples include, but are not limited to blades, vanes, blade tracks, and combustor liners). Technology improvements in cooling, materials, and coatings are required to achieve higher inlet temperatures. As the temperature capability of Ni-based superalloys has approached their intrinsic limit, further improvements in their temperature capability have become increasingly difficult. Therefore, the emphasis in gas turbine materials development has shifted to thermal barrier coatings (TBC) and next generation high temperature materials, such as ceramic-based materials.

SiC/SiC CMCs are prime candidates to replace Ni-based superalloys for hot section structural components for next generation gas turbine engines. The key benefits of SiC/SiC CMC engine components are their excellent high temperature, mechanical, physical, and chemical properties which allow gas turbine engines to operate at much higher temperatures than the current engines having superalloy components. SiC/SiC CMCs also provide the additional benefit of damage tolerance, which monolithic ceramics do not possess. The damage tolerance of SiC/SiC may be a result of a fiber interface coating that may result in crack deflection and crack bridging. During operation the prior art fiber interface coatings may be attacked by the environment which may reduce or negate their effectiveness to provide damage tolerance. The introduction of fiber interface coatings that are inert under the anticipated engine environment would greatly benefit these material systems. These systems would enhance life and reduce risk of material embrittlement.

The current SOA fiber interface coating chemistry of boron nitride or carbon has limited stability in an oxidizing/combustion environment. Damage during engine operation may result in exposure of the fiber interface to an oxidizing environment. This exposure may result in loss of the interface coating, or the formation of low temperature oxides that react with the matrix.

An illustrative embodiment of the present disclosure provides a method of fiber tow coating which comprises the steps of: providing a fiber tow made of a material that is selected from the group consisting at least one of a carbon material and a silicon material; and applying an oxide-based fiber interface coating onto the fiber tow using directed vapor deposition.

In the above and other illustrative embodiments, the method may further comprise the steps and limitations of: the oxide-based fiber interface coating being a ceramic oxide; the ceramic oxide being selected from the group consisting of a rare earth monosilicate, a rare earth disilicate, barium strontium aluminosilicate, mullite, yttrium aluminum garnet, and a rare earth monazite; a base of the rare earth monosilicate and the rare earth disilicate being selected from the group consisting of scandium, yttrium, lanthanum, cerium, praseodymium, neodymium, promethium, samarium, europium, gadolinium, terbium, dysprosium, holmium, erbium, thulium, ytterbium, and lutetium; a base of the rare earth monazite being selected from the group consisting of lanthanum, cerium, praseodymium, and neodymium; the fiber being a filament tow; the filament tow being a multifilament tow; the material of the filament tow being selected from the group consisting at least one of silicon carbide, silicon nitride, Si—N—C, and Si—O—C; the coating having a thickness of about 0.05 to about 2 microns; the fiber being selected from the group consisting of a woven fabric, a woven preform, a laminated preform, a wide tape of monofilament, and a multifilament; the coating being applied using a single source or a multiple source target; the coating being selected from the group consisting of a single composition, a graded composition, and a layered structure of a plurality of compositions; the deposition includes multiple deposition zones; the steps of passing the fiber through a deposition zone a plurality of times; the coating has a variable thickness; applying a coating onto the oxide-based fiber interface coating, wherein the coating is selected from the group consisting of silicon carbide, silicon nitride, Si—N—C, and Si—C—O; applying another oxide-based coating onto the coating; the fiber being coated on a continuous feed; the continuous feed being a reel system; the reel system applies tension to spread the fiber to improve infiltration; applying a coating onto the oxide-based fiber interface coating wherein the coating is applied prior to being taken up by a fiber take-up reel; and the coating includes a fiber sizing or a preceramic polymer.

Another illustrative embodiment provides a method fiber coating which comprises the steps of: providing a fiber tow made of a material that is selected from the group consisting at least one of a carbon material and a silicon material; and applying an oxide-based fiber interface coating onto the fiber tow using chemical vapor infiltration.

Another illustrative embodiment provides a method of fiber tow coating which comprises: providing a fiber tow made of a material that is selected from the group consisting at least one of a carbon material and a silicon material; applying a fiber interface coating selected from the group consisting of a boron nitride or carbon onto the fiber tow using a process selected from the group consisting of directed vapor deposition and chemical vapor infiltration; and applying a second layer on the oxide-based fiber interface coating wherein the second layer is selected from a group consisting of a Y disilicate, a Yb disilicate, barium strontium aluminosilicate, and lanthanum monazite.

Additional features and advantages of these methods will become apparent to those skilled in the art upon consideration of the following detailed description of the illustrated embodiment exemplifying the best mode of carrying out these methods as presently perceived.

BRIEF DESCRIPTION OF DRAWINGS

The present disclosure will be described hereafter with reference to the attached drawing which is given as a non-limiting example only, in which.

The exemplification set out herein illustrates embodiments of the methods and such exemplification is not to be construed as limiting the scope of the methods in any manner.

DETAILED DESCRIPTION

The present disclosure provides oxide-based fiber tow interface coatings for carbon or ceramic multifilament tows including silicon carbide (SiC), silicon nitride, Si—N—C, Si—O—C, and oxide fibers. The silicon carbide and oxide base include, but are not limited to, the products produced by Nippon Carbon, Ube Industries, ATK-COI Ceramics, Specialty Materials and 3M, for example. In an illustrative embodiment, the fiber coating thickness may range from about 0.05 microns to about 2 microns.

The proposed coating would be applied to a multifilament tow using directed vapor deposition (DVD) techniques. Woven fabrics, woven preforms, laminated preforms or wide tapes of monofilament or multifilament may be coated. The current DVD process can apply a range of fiber interface coating compositions that includes the current state-of-the-art boron nitride, carbon interfaces, and ceramic oxides. The ceramic oxides may include, but are not limited to, the rare earth monosilicates/disilicates (scandium, yttrium, lanthanum, cerium, praseodymium, neodymium, promethium, samarium, europium, gadolinium, terbium, dysprosium, holmium, erbium, thulium, ytterbium, and lutetium based), barium strontium aluminosilicate (BSAS), BAS, SAS, mullite, yttrium aluminum garnet (YAG), and rare earth monazites (lanthanum, cerium, praseodymium, or neodymium based).

Figure 1:
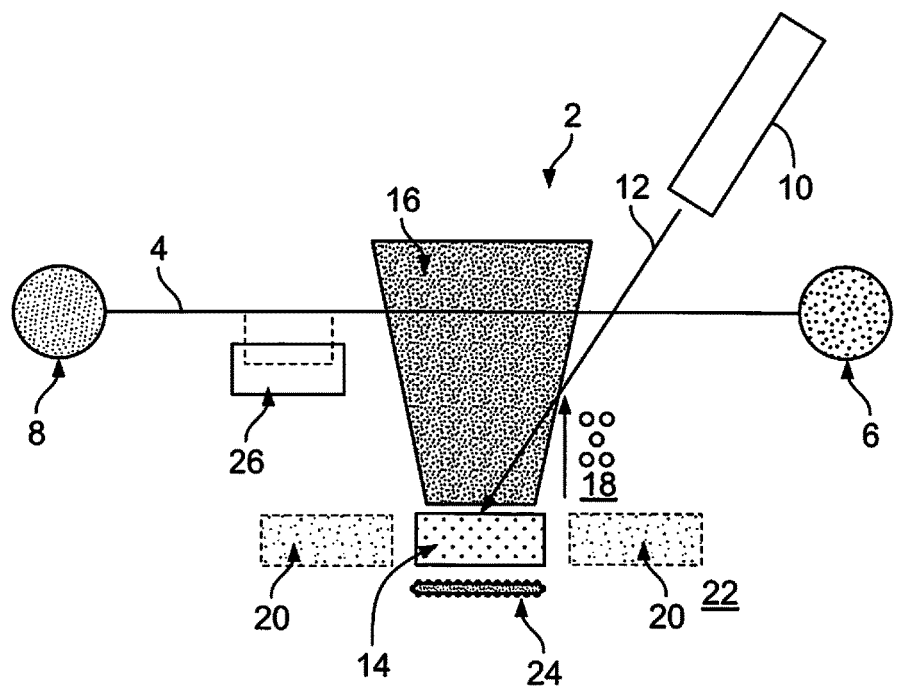
FIG. 1 is a schematic view of an illustrative fiber deposition system.

A schematic view of an illustrative fiber tow deposition system 2 is shown in FIG. 1. System 2 shows an illustrative fiber 4 strung between a fiber source reel 6 and a take-up reel 8. Vaporization input e-beam laser 10 emits beam 12 toward source material target 14 to create vapor deposition area 16. Fiber 4 passes through area 16 depositing vaporized source material (illustrated by reference number 18) onto it creating the coating. It is appreciated that option source materials 20, 22, and a heat source 24 may be added. In addition, an optional secondary coating system 26 may be added to coat fiber 4.

The coating may be applied using a single source or multiple source targets within the DVD process. The proposed coating may also be a single composition, a graded composition, or a layered structure of two or more compositions. In a continuous process, multiple deposition zones may be used to apply the coatings. The material to be coated may also be passed through the same deposition zone more than once by incorporation of appropriate rollers or other devices. The reaction zone cross section and size may be varied to vary the coating thickness. This may be especially useful for multi-layer coatings with different deposition kinetics or different target thicknesses. Layers of silicon carbide, silicon nitride, Si—N—C, and Si—C—O may also be applied on top of or in between the layers.

In a single layer fiber coating an oxide may be selected. This coating may include Y or Yb disilicate, BSAS, or lanthanum monazite. The proposed coating may also include a layered structure that can be a combination of the oxides listed above or of more traditional coating systems. For example, the first layer may consist of a boron nitride or carbon interface that is deposited using DVD or chemical vapor infiltration. The second layer may include Y or Yb disilicate, BSAS, or lanthanum monazite.

Figure 2:
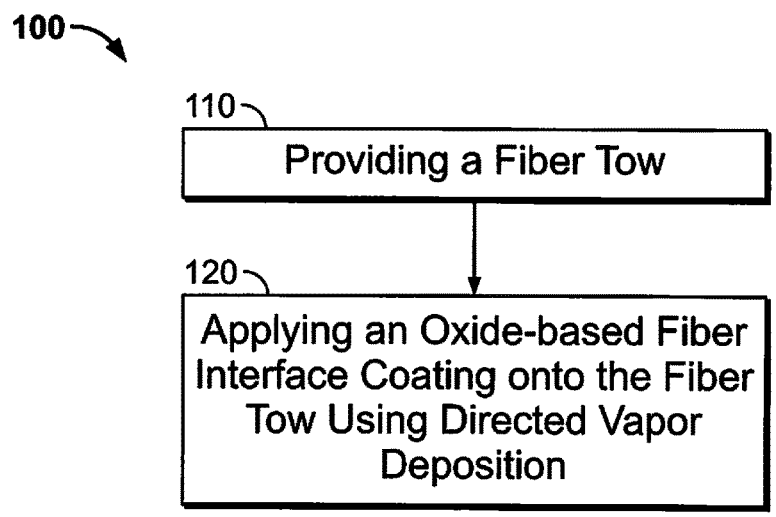
FIG. 2 is a block diagram depicting the method of applying an oxide-based fiber interface coating onto the fiber towing using directed vapor deposition (DVD).

In one example, as shown in FIG. 2, the coatings are applied using a DVD process. In addition to the DVD process, traditional fiber coating technologies (i.e. chemical vapor infiltration) may be incorporated into the process to create multilayer fiber coatings.

As described in FIG. 2, method 100, the process described herein may utilize directed vapor deposition (DVD), which is a novel type of electron beam-physical vapor deposition (EB-PVD). In a step 110, the fiber tow may be provided. The fiber tow may be an uncoated fiber tow or a coated fiber tow. In a step 120, an oxide based fiber interface coating may be applied onto the fiber tow using DVD. DVD may use an electron beam to form a vapor plume including the coating components, and a stream of gas is used to direct the vapor plume. Due to the gas stream, the vapor plume may be directed to internal cavities of components and DVD may be used to deposit the coating on internal surfaces of the components, such as surfaces of cooling channels in a blade or vane. The DVD process may require ingots of the target coating composite to be used. As the ingot evaporates the vapors, such as oxide vapors, may redeposit on the substrate. In the present application, two ingots may be used to control the rate of vaporization of each ingot to obtain the target coating composition. Two separate ingots may be used to account for vapor pressure differences. The process described herein may arrange the ingots and fibers to make a continuous process. The fibers may pass through the chambers in a continuous motion.

For the DVD coatings, a vapor pressure at deposition temperature of each elemental constituent may be calculated using standard thermodynamic practices.

Figure 3:
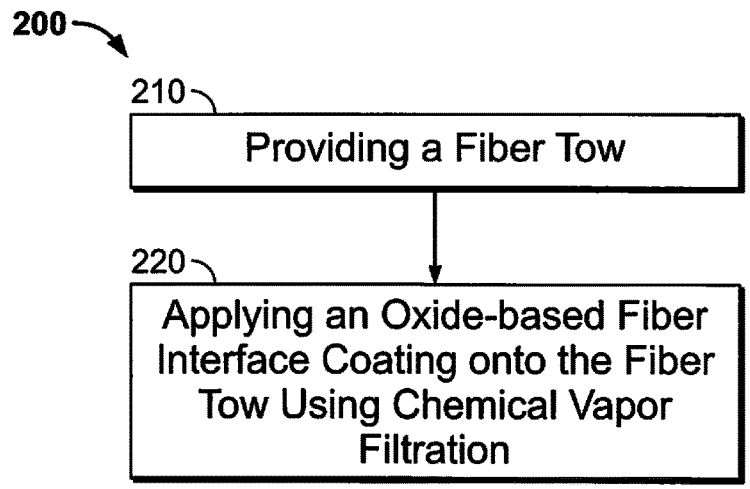
FIG. 3 is a block diagram depicting the method of applying an oxide-based fiber interface coating onto a fiber tow using chemical vapor infiltration.

As shown in FIG. 3 method 200, the fiber tow may be coated using chemical vapor infiltration. In a step 210 of the method 200 an uncoated fiber tow or a coated fiber tow may be provided. In a step 220 of the method 200, an oxide based fiber interface coating may be applied using chemical vapor infiltration also referred to as chemical vapor deposition (CVD). CVD may deposit a gaseous/vaporous coating onto the fiber tow to bond the coating onto the fiber tow in a continuous process.

Figure 4:
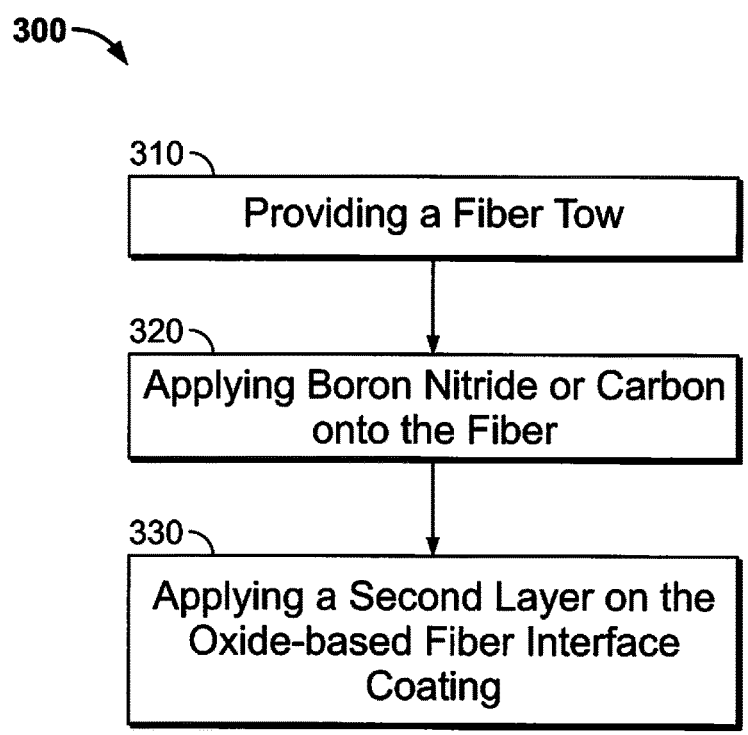
FIG. 4 is a block diagram depicting the method of applying boron nitride or carbon onto the fiber and then applying a second layer on the oxide based fiber interface coating.

As shown in FIG. 4 method 300, a second layer of coating may be applied on the fiber interface coating. In a step 310 of the method 300, a fiber tow may be provided. The fiber tow may have previously been coated according to the methods described in FIGS. 2 and 3. In a step 320, boron nitride or carbon may be applied onto the fiber. In a step 330 of the method 300, a second layer may be applied to the fiber tow. The second layer may be applied by either CVD or DVD as described above.

The proper sources would be selected to deposit the selected composition. The source may be a single source or multiple sources. This will depend on the vapor pressures and desired kinetics of the reaction. The source material may also be fabricated using standard ceramic processing, or by induction melting.

The source material may be heated using e-beam, laser, or by an induction melting approach. Induction melting may be introduced as the only heating source, or it can be combined with e-beam and laser. The induction source may be applied to a single or multiple sources.

The vaporized material is carried to the multifilament tow, by a carrier gas. The carrier gas may be inert or a reactive species.

A multifilament tow may be coated in this process. The process may also accommodate a continuous feed. For example, the continuous feed may be a reel system. The reel system may apply tension to spread the fiber to improve infiltration. The source fiber can be fed by a reel system that applies tension to spread the fiber tow for improved infiltration. In a continuous operation, the fiber tow may be coated by an optional secondary coating. This secondary coating may be applied prior to the fiber take-up reel. The secondary coating may include, but is not limited to, a fiber sizing or preceramic polymer. A coating may be applied onto the oxide-based fiber interface coating where the coating may be applied prior to being taken up by a fiber take-up reel. The coating may have a thickness of between about 0.05 microns and about 10 microns. Specifically the thickness may be between about 0.05 microns and about 2 microns.

The interface coatings applied using the DVD process have improved stability in an oxidizing/combustion environment. This improvement may provide: (1) increased life after matrix cracking; (2) increased design margin, and improved fiber interface coatings would allow designs to locally exceed matrix cracking; (3) increased life after the loss of an environmental barrier coating; and (4) avoidance of low temperature oxidation embrittlement.

Additional benefits may further include: (1) reduced cycle time for interface coating depositions; (2) increased composition window when compared to current processing boron nitride fiber interface coatings; (3) coating system that can be applied to high oxygen content SiC base fibers (CG Nicalon, Tyranno ZMI); (4) improved thermal expansion match with the fiber and/or matrix; and (5) increased shear strength that can improve load sharing in a ceramic matrix composite. If the strength of the fiber coating is limiting interlaminar properties, a stronger coating may also improve interlaminar properties.

Although the present disclosure has been described with reference to particular means, materials, and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A method of fiber tow coating, the method comprising the steps of:
   providing a fiber tow of a material that is selected from the group consisting of at least one of a carbon material and a silicon material;
   applying an oxide-based fiber interface coating onto the fiber tow using directed vapor deposition; and
   applying a coating onto the oxide-based fiber interface coating, wherein the coating is selected from the group consisting of silicon carbide, silicon nitride, Si—N—C, and Si—C—O.

2. The method of claim 1, wherein the oxide-based fiber interface coating is a ceramic oxide.

3. The method of claim 2, wherein the ceramic oxide is selected from the group consisting of a rare earth monosilicate, a rare earth disilicate, barium strontium aluminosilicate, mullite, yttrium aluminum garnet, and a rare earth monazite.

4. The method of claim 3, wherein a base of the rare earth monosilicate and the rare earth disilicate are is selected from the group consisting of scandium, yttrium, lanthanum, cerium, praseodymium, neodymium, promethium, samarium, europium, gadolinium, terbium, dysprosium, holmium, erbium, thulium, ytterbium, and lutetium.

5. The method of claim 3, wherein a base of the rare earth monazite is selected from the group consisting of lanthanum, cerium, praseodymium, and neodymium.

6. The method of claim 1, wherein the fiber tow is a filament tow.

7. The method of claim 6, wherein the filament tow is a multifilament tow.

8. The method of claim 6, wherein the material of the filament tow is selected from the group consisting at least one of silicon carbide, silicon nitride, Si—N—C, and Si—O—C.

9. The method of claim 1, wherein the fiber tow is selected from the group consisting of a woven fabric, a woven preform, a laminated preform, a wide tape of monofilament, and a multifilament.

10. The method of claim 1, wherein the coating is applied using a multiple source target.

11. The method of claim 1, wherein the coating comprises a graded composition or a layered structure of a plurality of compositions.

12. The method of claim 1, wherein the deposition includes multiple deposition zones.

13. The method of claim 1, further comprising the steps of passing the fiber through a deposition zone a plurality of times.

14. The method of claim 1, wherein the coating has a variable thickness.

15. The method of claim 1, further comprising the steps of applying another oxide-based coating onto the coating.

16. The method of claim 1, wherein the fiber tow is coated on a continuous feed.

17. A method of fiber tow coating, the method comprising the steps of:
   providing a fiber tow made of a material that is selected from the group consisting of at least one of a carbon material and a silicon material;
   applying an oxide-based fiber interface coating onto the fiber tow using chemical vapor infiltration; and
   applying a coating onto the oxide-based fiber interface coating, wherein the coating is selected from the group consisting of silicon carbide, silicon nitride, Si—N—C, and Si—C—O.

18. A method of fiber tow coating, the method comprising the steps of:
   providing a fiber tow made of a material that is selected from the group consisting of at least one of a carbon material and a silicon material;
   applying boron nitride or carbon onto the fiber tow using a process selected from the group consisting of directed vapor deposition and chemical vapor infiltration, thereby forming an oxide-based fiber interface coating on the fiber tow; and
   applying a second layer on the oxide-based fiber interface coating wherein the second layer is selected from a group consisting of a Y disilicate, a Yb disilicate, barium strontium aluminosilicate, and lanthanum monazite.

* * * * *